United States Patent [19]

Pezzutti

[11] 3,838,348

[45] Sept. 24, 1974

[54] DIGITAL MULTIFREQUENCY SIGNAL GENERATOR

[75] Inventor: David August Pezzutti, Eatontown, N.J.

[73] Assignee: Bell Telephone Laboratories, Incorporated, Murray Hill, N.J.

[22] Filed: June 25, 1973

[21] Appl. No.: 373,426

[52] U.S. Cl. .................. 328/167, 328/58, 307/209, 328/27, 307/266

[51] Int. Cl. .................. H03b 1/04

[58] Field of Search .................. 328/17, 27, 167, 58; 307/266; 331/51

[56] References Cited

UNITED STATES PATENTS

| | | | |
|---|---|---|---|
| 3,657,657 | 4/1972 | Jefferson | 328/27 X |
| 3,657,669 | 4/1972 | Pruakis | 328/167 X |
| 3,699,461 | 10/1972 | Huntsinger | 328/167 X |
| 3,701,027 | 10/1972 | Belton | 328/17 |
| 3,712,045 | 1/1973 | Ito | 307/266 X |
| 3,719,897 | 3/1973 | Tarr | 331/51 |

*Primary Examiner*—John S. Heyman
*Attorney, Agent, or Firm*—Thomas Stafford

[57] ABSTRACT

Tone signals are generated at selected frequencies by employing a programmable digital divider in conjunction with a low-pass filter. Transient signal components are minimized by selectively shaping and biasing the divider output. Pre-emphasis of the divider output amplitude at the frequencies of interest allows use of simplified filter arrangement.

16 Claims, 9 Drawing Figures

DIGITAL MULTIFREQUENCY SIGNAL GENERATOR

BACKGROUND OF THE INVENTION

This invention relates to signal generators and, more particularly, to circuits for selectively generating multifrequency signals.

Many systems employ individual and multifrequency sine-wave signals to perform control and signaling functions. For example, multifrequency signals are utilized in telecommunications systems for in-system signaling purposes. Such multifrequency signals have been generated by employing a plurality of analog oscillators each of which has a distinct frequency. Gate circuits are then utilized to select signals at the individual frequencies which make up the desired multifrequency signal. Typically, analog oscillators include inductors and/or capacitors which are large in size and require both initial and periodic adjustment to realize and maintain the desired signal frequencies. Such adjustments are cumbersome and time consuming and, therefore, should be avoided.

Many of the problems attributable to prior analog multifrequency signal generators have been eliminated by employing digital techniques to generate the desired sine-wave signals.

Recently a plurality of sine-wave signals each having a distinct frequency has been generated digitally by employing a single pulse signal source and a plurality of digital divider circuits. The dividers yield pulse signals at desired frequencies which are converted via appropriate filters to the desired sine-wave signals. Again, individual ones of the signals may be selected by employing gate circuits and combined to form a desired multifrequency signal.

More recently, sine-wave signals having distinct frequencies have been generated by employing a single programmable digital divider. Here again the pulse signal output from the divider is converted to a sine-wave signal by employing an appropriate filter. Different frequency signals are obtained by programming the divider in accordance with a prescribed format. Signals generated by a plurality of such circuit arrangements may be selectively combined to generate desired multifrequency signals.

Problems arise in the prior known digital systems when initiating the generation of a signal and when switching from one frequency to another. Specifically, transient signal components result in the filter output which, if not suppressed, supply a relatively high energy spurious signal to the signal transmission media. Transient signal components are especially undesirable in communications systems where the multifrequency signals are transmitted over the communications channel, for example, a telephone trunk or the like, which is employed for voice communications. In such systems, transient signal components typically cause undesirable effects, for example, noise, crosstalk and the like.

An additional problem in prior known digital multifrequency signal generators is the elimination of harmonic content from the filter output. As is well known, a square-wave signal has an appreciable third harmonic component. These third harmonics may be at frequencies utilized for other signaling and testing purposes. Therefore, it is important that harmonics of the signal frequencies being generated are substantially suppressed. Heretofore this suppression was achieved by employing filters having a substantially flat attenuation characteristic through the highest signal frequency of interest which thereafter drops off extremely sharply with frequency. Such filters are usually complex and require special selection of component values as well as fine tuning to realize the desired attenuation characteristic.

SUMMARY OF THE INVENTION

These and other problems are overcome in accordance with the inventive principles herein to be described in a digital sine-wave signal generator of the type including a controllable digital divider and low pass filter arrangement. Pulse signals at desired frequencies are selectively generated by the digital divider in response to supplied control signals. These pulse signals are subsequently converted by the filter to sine-wave signals. The frequency of the signal being generated is rapidly changed on command by simply supplying a different control signal to the digital divider. Possible transient signal components from a first source are minimized, in accordance with the invention, by shaping the pulse signal output from the divider in a prescribed manner, while additional possible transient signal components from a second source are minimized by biasing the input to the filter so that the pulse signal from the divider has a zero average value.

Another aspect of the invention concerns minimizing unwanted harmonic content in the filter output. Harmonic signal components are minimized, in accordance with the invention, by utilizing a "simple" low-pass filter arrangement having a "corner" frequency, i.e., break point in its attenuation characteristic at a frequency within or below the band of interest, for example, at or below the lowest frequency of interest. Predetermined signal amplitude values at the desired frequencies are obtained by pre-emphasizing the amplitudes of the pulse signals at those frequencies in accordance with a prescribed format related to the attenuation characteristic of the filter.

One embodiment of the invention includes a clock pulse source for generating pulse signals at a prescribed frequency selected to obtain a desired precision. A programmable digital divider supplied with the clock pulses selectively generates, in response to control signals, pulse signals at frequencies of interest. The pulse output from the divider is converted to a square-wave signal in which the time interval of at least the initial pulse is less than the time intervals of subsequent pulses. This is achieved, in this example, by employing a divide-by-four circuit for generating a square-wave signal having a fundamental frequency at the frequency of interest and a controllable gate circuit. The divide-by-four circuit includes a plurality of flip-flop circuits each of which is preset to a one count, thereby causing the first pulse of the square-wave signal generated at each frequency at the output of the controllable gate circuit to have a width one half that of subsequent pulses. This one-half width pulse minimizes, in accordance with the invention, certain transient signal components from occurring upon subsequent filtering of the square-wave signal. The square-wave signal is supplied via the controllable gate circuit and a pre-emphasis resistor to a summing node. Additional signals at other frequencies of interest may also be generated as described above and selectively supplied via corresponding gate circuits and pre-emphasis resistors to the summing node to obtain multifrequency signals as desired. Resistance values are selected for the pre-emphasis resistors to adjust the amplitudes of the individual pulse signals to obtain sine-wave signals having predetermined amplitudes upon subsequent filtering. The summing node is biased at a predetermined direct current potential to insure that the square-wave signal developed there has a zero average value. This biasing, in turn, minimizes additional transient signal components from occurring upon subsequent filtering of the square-wave signal. The summed pulse signal is thereafter supplied to a single low-pass filter wherein it is converted to the desired single frequency or multifrequency sine-wave signal. As discussed above, the "corner" frequency of the filter attenuation characteristic is set at a frequency within or below the frequency band of interest, thereby allowing the use of a "simple" filter arrangement to obtain a desired attenuation of unwanted harmonic components. The amplitudes of the pulse signals at the frequencies of interest are adjusted via the pre-emphasis resistors to obtain a desired sine-wave signal amplitude upon filtering.

BRIEF DESCRIPTION OF THE DRAWINGS

These and other objects and advantages of the invention will be more fully understood from the following detailed description and illustrative embodiment taken in connection with the appended drawings wherein.

DETAILED DESCRIPTION

Figures 1, 2:
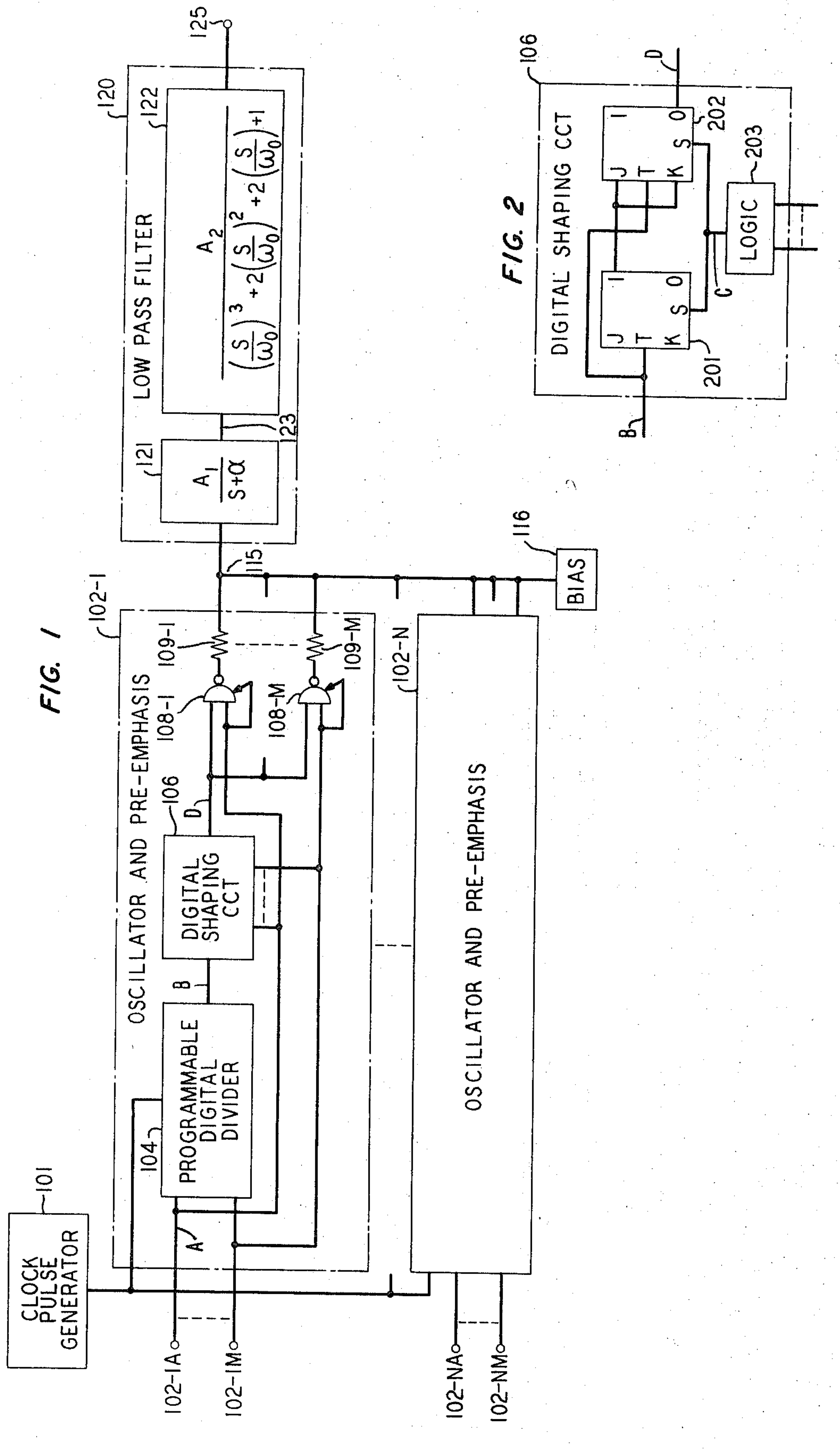
FIG. 1 shows in simplified block diagram form a digital multifrequency sine-wave signal generator illustrating the invention.
FIG. 2 depicts details of a digital shaping circuit used in the signal generator of FIG. 1.

FIG. 1 depicts in simplified block diagram form a digital sine-wave signal generator in accordance with the invention. Although the instant invention is herein described in the context of a multifrequency signal generator, it is equally applicable to the generation of individual sine-wave signals.

Accordingly, a clock pulse signal having a predetermined frequency is generated in clock pulse generator 101 and is supplied to each of oscillator and pre-emphasis circuits 102–1 through 102–N. The frequency of generator 101 is selected to realize a desired precision.

Each of oscillator and pre-emphasis circuits 102–1 through 102–N includes essentially identical components, differences between the circuits being only the signal frequencies available at the respective outputs and the amplitude pre-emphasis added. Accordingly, only oscillator and pre-emphasis circuit 102–1 shall be described in detail.

Thus, clock pulses from generator 101 are supplied to programmable digital divider 104 which, for example, is a programmable digital counter of a type now well known in the art. Such counter circuits respond to individual logical control signals for altering the internal pulse count to yield output pulse signals at desired frequencies. Therefore, control signals are supplied via terminals 102–1A through 102–1M to programmable divider 104, to digital shaping circuit 106 and to a first input of controllable gates 108–1 through 108–N. Divider 104 responds to a supplied control signal, for example, ground potential, to generate pulse signals at periodic intervals corresponding to a desired frequency. The signal frequency is rapidly changed on command simply by supplying a different control signal to divider 104. The divisor of divider 104 is selected to be at a value so that a pulse signal is generated having a frequency four times greater than the desired frequency. The reason for generating such a pulse signal is discussed below. Since divider 104 can only divide by integers, a desired degree of precision in obtaining "exact" frequencies is obtained by selecting the frequency of the pulse signal generated in clock pulse generator 101. For example, the higher the frequency of the clock pulse signal, the greater the precision in obtaining a desired frequency upon subsequent division.

Pulse signals from divider 104 are supplied to digital shaping circuit 106 for generating a square-wave signal. Circuit 106 is also employed in conjunction with an appropriate one of gates 108; to shape the square-wave signal, in accordance with the invention, for effectively minimizing certain transient components which would otherwise result upon subsequent filtering of the square-wave signal. The cause of these transient components is discussed below. Specifically, the first pulse generated at each desired frequency has, in accordance with the invention, a width equal to one-half the width of subsequent pulses generated at the particular frequency. This is achieved, in this example, by employing a divide-by-four digital circuit having a plurality of stages (FIG. 2) each of which is initially set to a one count, i.e., circuit 106 is set to an all one count. Since the frequency of the pulse signal output from divider 104 is four times greater than the desired frequency, the output of shaping circuit 106 is at the desired frequency. Shaping circuit 106 is reinitialized to the all one count for each frequency via the control signal supplied from one of terminals 102–1A through 102–M. Other circuit arrangements may equally be employed to realize the desired shaping of the square-wave signal. For example, a divide-by-two circuit arrangement may be employed. However, such a circuit arrangement is more complex than the preferred divide-by-four arrangement and, therefore, requires additional circuit components.

Turning briefly to FIG. 2, there is shown details of a preferred divide-by-four circuit. In this example, J–K flip-flops 201 and 202 are employed to realize the divide-by-four function. Control signals from terminals 102–1A through 102–1M (FIG. 1) are supplied via logic network 203 to set flip-flops 201 and 202 to a predetermined state thereby causing the divide-by-four to be set to an initial one count at each signal frequency. Logic network 203 may include a plurality of inverter circuits (not shown) to provide isolation between control signal inputs 102 and also to provide an appropriate pulse signal for setting flip-flops 201 and 202 to an initial "1" state. Once flip-flops 201 and 202 are each set to a one count, i.e., the "1" outputs are both in a "1" state, the "0" output of flip-flop 202 will switch from a "0" to a "1" in response to the next pulse supplied to circuit 106. Thereafter, operation of digital shaping circuit 106 in response to the pulse output of divider 104 is straight-forward.

Returning to FIG. 1, the altered square-wave output from circuit 106 is supplied to a second input of each of controllable gate circuits 108–1 through 108–N. As stated above, the frequency control signals are supplied to a first input of each of gates 108. The outputs from gates 108–1 through 108–N are supplied to preemphasize resistors 109–1 through 109–N, respectively. In turn, resistors 109 are connected in common to circuit point 115. Desired square-wave signals from additional oscillator and pre-emphasis circuits 102–2 (not shown) through 102–N are supplied as desired to circuit point 115 where they are summed to form multifrequency signals.

Gates 108 are so-called "tri-state" logic gates. Such gate circuits have three possible output modes, namely, "high" (representative of a logical 1), "low" (representative of a logical 0) and "open" (representative of no input). Such tri-state logic circuits are more thoroughly described in "Digital Integrated Circuits" manual published by National Semiconductor Corporation in May, 1971 beginning at page xii Operation of NAND tristate logic gates 108 shown in FIG. 7 in response to input signals supplied thereto is summarized in the following Table:

| Input 1 | Input 2 | Output |
|---|---|---|
| 1 | 1 | Open |
| 0 | 1 | Open |
| 1 | 0 | 0 |
| 0 | 0 | 1 |

By employing tri-state gates 108 loading of summing point 115, i.e., current drain through resistors 109, is eliminated. That is, each of resistors 109 is effectively open-circuited and, hence, removed from circuit point 115, when the corresponding one of gates 108 is disabled. Operation of oscillator and pre-emphasis circuit 102–1 (FIG. 1) and digital shaping circuit 106 (FIG. 2) may best be summarized by referring to the sqeuence of waveforms shown in FIG. 6. The waveforms of FIG. 6 have been labelled to correspond to the circuit points as indicated in FIGS. 1 and 2. Accordingly, a clock signal (not shown) at an appropriate frequency is supplied to programmable digital divider 104. Divider 104 responds to a control signal supplied, for example, via input 102–1A, as shown in waveform A of FIG. 6, to generate a pulse output at a desired frequency, as shown in waveform B of FIG. 6. As discussed above, the output of divider 104 has a frequency four times that of the sine-wave signal to be generated. An appropriate logic element in logic 203, for example, in inverter (not shown), also responds to the control signal supplied via input 102–A to generate a "high" state signal, as shown in waveform C of FIG. 6. This high state signal is supplied to the set inputs of flip-flops 201 amd 202, thereby setting each of flip-flops 201 and 202 to an initial one count. That is to say, the "1" outputs of flip-flops 201 and 202 are initially set by the control signal to a "1" state. Therefore, the "0" output of flip-flop 202 is set to an initial "0" state, as shown in waveform D of FIG. 6. Setting both filp-flops 201 and 202 to a "1" state and, hence, digital shaping circuit 106

Figure 6:
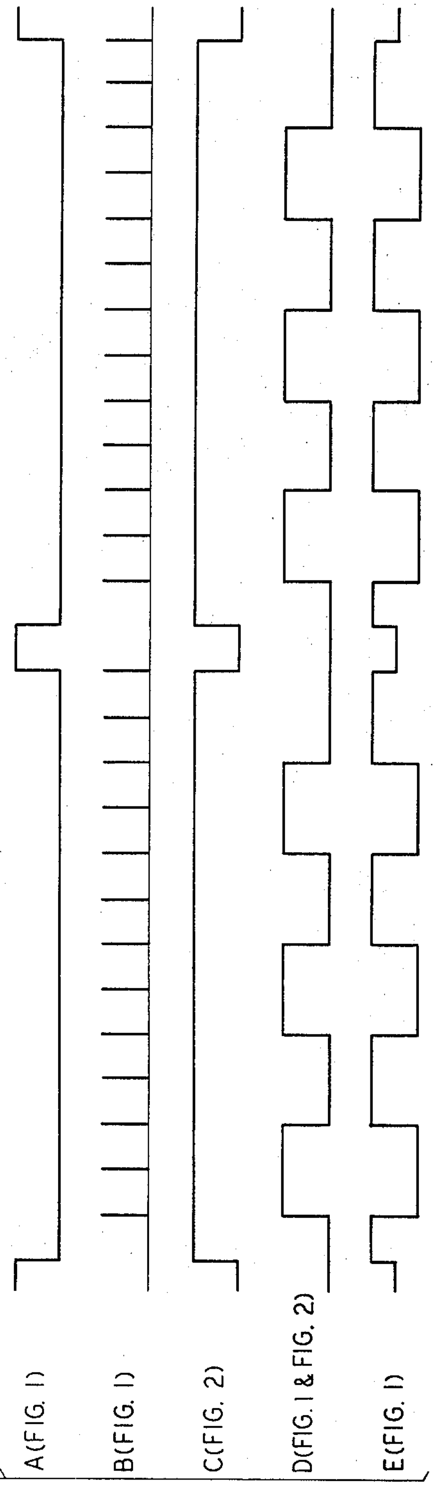
FIG. 6 depicts a sequence of waveforms useful in describing the operation of the invention.

(FIG. 2) to an all one count, or three count, causes the "0" output of flip-flop 202 to switch from a "0" state to a "1" state in response to the next supplied pulse from divider 104, as shown in waveform D of FIG. 6. Thereafter circuit 106 functions as a "normal" divide-by-four circuit until it is reinitialized by the next supplied control signal. The output from circuit 106 (FIG. 1), as shown in waveform D of FIG. 6, is supplied to one input of tri-state NAND gate 108–1 and the control signal, as shown in waveform A of FIG. 6, is supplied via input 102–1A to a second input of tri-state NAND gate 108–1 (FIG. 1). Gate 108–1 responds to the supplied signals in a manner as summarized in the above table to generate a version of the supplied pulsating signal, in accordance with the invention, having an initial pulse width less than subsequent pulse width pulses generated at each frequency of interest as shown in waveform E of FIG. 6 and the waveform of FIG. 4A. In this example, the width of the initial pulse is one-half that of subsequent pulses so that the amplitude of the initial sine-wave developed at the output of filter 120 is free of amplitude transients. This is demonstrated by the waveforms shown in FIG. 4 as described below.

Typically, square-wave signals generated by employing a flip-flop circuit or the like, have amplitudes which vary from ground potential to some positive or negative potential. Such square-wave signals include a direct current component, fundamental frequency component and odd order harmonics, for example, third, fifth, seventh, etc. The direct current component would cause an initial transient component upon subsequent filtering of the square-wave signal, as is well known in the art. Accordingly, the direct current component of the square-wave signals is effectively eliminated by supplying via bias supply 116 an appropriate direct current potential to circuit point 115. The amplitude of the bias potential is selected at a value so that the square-wave signals developed at point 115 have a substantially zero average value. Consequently, possible transient signal components are substantially eliminated which would otherwise result upon subsequent filtering of the square-wave signals.

As stated above, each square-wave signal supplied to summing point 115 contains a fundamental frequency component and odd order harmonics, for example, third, fifth, seventh, etc. As is well known in the art, the third harmonic component has an appreciable amplitude. Thus, the third harmonic of the signal frequencies of interest may be at a frequency of some other signal of interest, in or out of the frequency band being generated. Consequently, the third harmonic component usually must be substantially suppressed. Heretofore, this suppression was achieved by employing rather complex filter arrangements which required tuning and special selection of circuit components to obtain the desired attenuation characteristic. In the present invention, however, desired suppression of unwanted harmonic components is realized by employing relatively "simple" fourth order low-pass filter 120. Filter 120 includes, for example, lossy integrator 121 and third order section 122.

Figure 5:
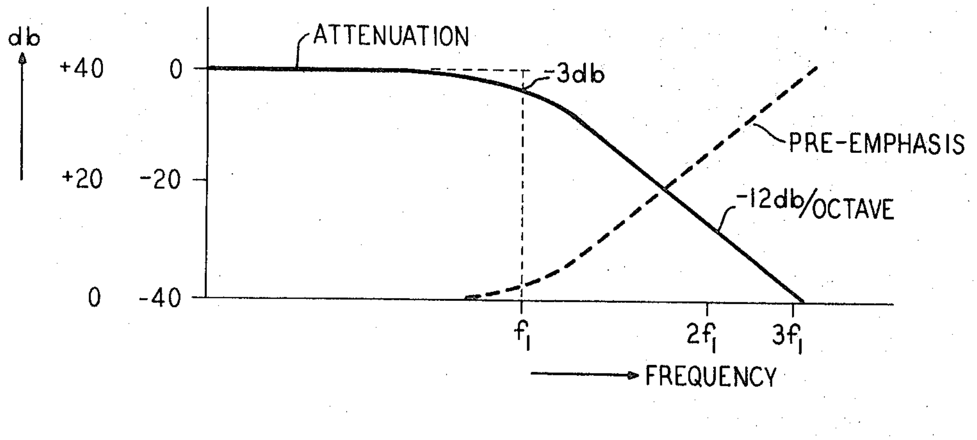
FIG. 5 depicts in graphical form the attenuation characteristic of the filter used in the circuit of FIG. 1 and a corresponding pre-emphasis characteristic.

FIG. 5 shows in solid line the attenuation versus frequency characteristic of low-pass filter 120. The attenuation characteristic is substantially constant, at zero attenuation, through the lowest frequency of interest, for example, frequency $F_1$. In this example, frequency $F_1$ is at the so-called corner frequency or break point, i.e., the 3 db attenuation point, of the frequency characteristic. Thereafter, the attenuation increases with frequency at a −12 db/octave rate.

It is desired that the sine-wave signals being generated have a constant amplitude at all frequencies of interest. The constant amplitude is realized, in accordance with the invention, by pre-emphasizing via resistors 109–1 through 109–M, the amplitudes of the individual square-wave signal outputs from shaping circuit 106. The resistance values of the individual resistors 109–1 through 109–M are selected to adjust the amplitude of the square-wave outputs from gates 108–1 through 108–M, respectively, in accordance with the pre-emphasis characteristic shown in dashed outline in FIG. 5. Thus, the resistance values of resistors 109 are selected so that the amplitudes of the square-wave signals supplied to summing point 115 increase with frequency in accordance with the pre-emphasis characteristic of FIG. 5. By so adjusting the amplitudes of the square-wave signals at the frequencies of interest, a substantially simplified configuration of filter 120 is utilized effectively to yield single frequency or multifrequency sine-wave signals at output terminal 125.

In operation, generation of a desired single frequency or multifrequency sine-wave signal is initiated by supplying control signals to appropriate ones of input terminals 102 of a desired number of oscillator and pre-emphasis circuits 102–1 through 102–N. The control signals are employed to preset digital dividers 104 for obtaining pulse signals at periodic intervals corresponding to the selected frequencies, to preset the stages of shaping circuit 106 to a one count and to enable an appropriate one of gates 108 for supplying an altered version of the square-wave output from circuit 106 to summing point 115 via a corresponding one of pre-emphasis resistors 109. As stated above, shaping circuit 106 in conjunction with individual ones of gates 108 generates a pulse-wave form in which the first pulse has a width equal to one-half the width of subsequent pulses generated at each frequency. This shaping, in accordance with the invention, minimizes certain transient components which would otherwise result upon passing the signal through filter 120.

Figure 3A:
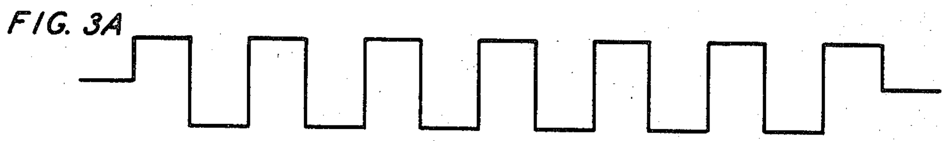
FIGS. 3A and 3B illustrate waveforms useful in describing one aspect of the invention.
Figure 3B:
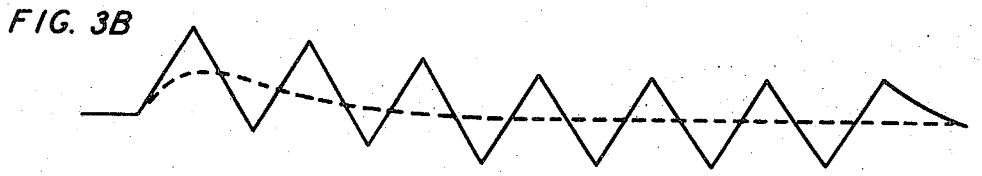

FIG. 3A illustrates a square-wave signal which would be developed at point 115 absent the digital shaping. The square-wave signal shown in FIG. 3A has been biased via supply 115 to have a substantially zero average value. As illustrated in FIG. 3B, the output from lossy integrator 121, at 123, has an initial amplitude twice that of the desired steady state output. The dashed outline in FIG. 3B illustrates a time varying d.c. component which would also be developed. Corresponding transient components result in the sine-wave output of filter 120 at 125 (FIG. 1). These transient components are caused by the initial response of filter 120 to the supplied square-wave signal shown in FIG. 3A. It is well known that filter arrangements, including a lossy integrator or the like, generate initial transient components in response to a supplied square-wave signal, which transients subside after a number of periods of the supplied signal. Such a condition is illustrated in FIG. 3B. These transient components are caused by the initial conditions of integrator 121 and hence filter 120. Specifically, the output of integrator 121 is initially at zero potential. Thus, integrator 121 responds to the first pulse of the supplied square-wave signal to generate a positive going signal which increases from zero potential to some positive potential over the entire pulse width interval. During subsequent pulse intervals, i.e., the steady state condition, the initial condition of each integration interval, both positive and negative, is some negative or positive potential, respectively. Thus, the output from integrator 121 swings between equal positive and negative potentials. Since the integration during the first pulse interval began at zero potential and since the integration occurred over the entire pulse width interval, the amplitude of the initial output from integrator 121 and, hence, filter 120, is twice that of the subsequent steady state amplitude. Such transient components are undesirable, especially in telephone communication systems because of the high amplitude energy burst supplied to the communication channel. Such energy bursts typically cause undesirable effects such as noise, crosstalk and the like.

Figure 4A:
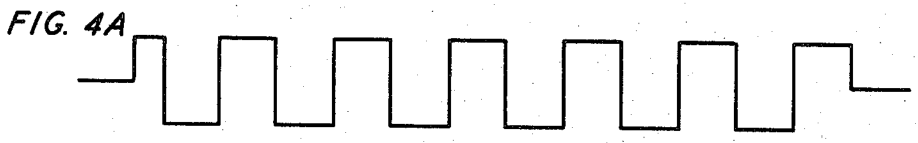
FIGS. 4A and 4B illustrate additional waveforms useful in describing the invention.
Figure 4B:
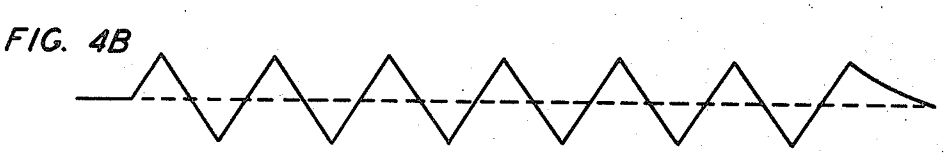

FIG. 4A illustrates a typical square-wave signal generated, in accordance with the invention, by employing digital shaping circuit 106 in conjunction with individual ones of gates 108. The first pulse has a width equal to one-half the width of subsequent pulse signals. Accordingly, the initial integration interval of integrator 121 in one-half that of subsequent integration intervals and, hence, the initial transient is eliminated. FIG. 4B illustrates the resulting signal upon passing the square-wave of FIG. 4A through lossy integrator 121. Note that there are no transient components present. The output from lossy integrator 121 is passed through third order section 122 to yield the desired sine-wave signal at terminal 125.

The above-described arrangements are, of course, merely illustrative of the application of the principles of the invention. Numerous other arrangements may be devised by those skilled in the art without departing from the spirit or scope of the invention. For example, the use of a bias supply to realize a zero average value signal at summing point 115 may be eliminated by employing logic gates or the like which have both positive and negative output potential. That is, the output of gates 108 (FIG. 1) could swing between equal positive and negative potentials. Again, other arrangements may also be equally employed for obtaining the desired wave shaping and pre-emphasis of the square-wave signals.

What is claimed is:

1. In a digital signal generator of the type including at least one controllable digital divider for selectively generating pulse signals at each of a plurality of frequencies of interest and at least one filter for converting the pulse signals to sine-wave signals, the improvement which comprises, means responsive to the pulse signals from the digital divider for generating a pulsating signal having a substantially rectangular waveform in which the pulse width of at least the initial pulse of said pulsating signal generated at each frequency of interest is less than the pulse width of subsequent pulses of said pulsating signal during each interval that said pulsating signal is generated, the pulse width of said initial pulse and the pulse width of said subsequent pulses being in a prescribed relationship for minimizing transient signal components in the resulting sine-wave output from the filter.

2. Apparatus as defined in claim 1 wherein said pulsating signal generating means includes digital counting means controllably settable to a prescribed initial condition upon initiating generation of a signal at each of the frequencies of interest and controllable means responsive to a control signal and a pulsating output signal from said counting means for generating said pulsating signal in which the pulse width of the initial pulse generated at each frequency is less than the pulse width of subsequent pulses generated at each frequency.

3. The apparatus as defined in claim 2 wherein the frequency of the pulse signals from the divider is four times the frequency of the desired sine-wave signal and said digital counting means includes a plurality of stages arranged to effect a divide-by-four function, and further including means responsive to said control signal for setting each stage of said mounting means to an initial count of one upon initiating generation of a signal at each of the frequencies of interest.

4. The apparatus as defined in claim 3 wherein said signal generating means further includes means for yielding a pulsating signal having a substantially zero average value.

5. The apparatus as defined in claim 1 further including means for adjusting the amplitude of said pulsating signal at each frequency of interest to a predetermined level, said predetermined level being determined in accordance with the attenuation versus frequency characteristic of the filter so that the amplitude of the sine-wave output from the filter is constant for all frequencies of interest.

6. Apparatus as defined in claim 3 wherein said controllable means is a tri-state logic gate.

7. In a digital signal generator of the type including at least one controllable digital signal source for selectively generating pulse signals at each of a plurality of frequencies of interest, apparatus for converting the pulse signals to pulsating signals having a substantially rectangular waveform and a low-pass filter for converting the pulsating signals to sine-wave signals, characterized in that, the low-pass filter has an attenuation versus frequency characteristic having a corner frequency at a frequency less than the highest frequency of interest and including means for adjusting the amplitude of the individual pulsating signals at each frequency of interest to a predetermined level, said predetermined level being determined in accordance with the attenuation versus frequency characteristic of the low-pass filter so that the amplitude of the sine-wave output from the filter is constant for all frequencies of interest.

8. Apparatus as defined in claim 7 wherein said amplitude adjusting means includes controllable means responsive to individual control signals assigned to the individual frequencies of interest for adjusting the amplitude of said pulsating signal to said predetermined levels assigned to each of said frequencies of interest.

9. Apparatus as defined in claim 8 wherein said amplitude adjusting means further includes a plurality of impedance means in circuit relationship with said controllable means and a summing point, each of said impedance means being assigned to a frequency of interest and having a prescribed component value determined in accordance with the attenuation versus frequency characteristic of the low-pass filter for adjusting the amplitude of said pulsating signal at the assigned frequency of interest so that the sine-wave output from said filter has a predetermined amplitude.

10. Apparatus as defined in claim 9 wherein said controllable means includes a plurality of controllable gate means in circuit relationship with the pulsating signal generating apparatus and in one-to-one circuit relationship with said impedance means, each of said controllable gate means being responsive to a supplied control signal for supplying a version of said pulsating signal to an associated one of said impedance means.

11. Apparatus as defined in claim 10 wherein each of said controllable gate means is a logic gate having a plurality of inputs and an output, said logic gates being responsive to predetermined signals supplied to said inputs to yield a high state output for a first predetermined combination of input signals, a low state output for a second predetermined combination of input signals and an open circuit state output for a third predetermined combination of input signals, said pulsating signal being supplied to one of said inputs and said control signals being selectively supplied to another of said inputs.

12. Apparatus as defined in claim 7 wherein the apparatus for converting the pulse signals from the digital signal source to pulsating signals includes means responsive to the pulse signals for generating a pulsating signal having a substantially rectangular waveform in which the pulse width of at least the initial pulse of said pulsating signal at each frequency of interest is less than the pulse width of subsequent pulses of said pulsating signal, the pulse width of said initial pulse and the pulse width of said subsequent pulses being in a prescribed relationship for minimizing transient signal components in the resulting output from the filter.

13. Digital apparatus for generating multifrequency signals including combinations of a plurality of frequencies of interest which comprises:

a low-pass filter having a predetermined attenuation versus frequency characteristic in which the corner frequency of said filter characteristic is at a frequency less than the highest frequency of interest;

at least first and second controllable means supplied with clock pulses at a pre-established rate and being responsive to individual control signals for selectively generating pulsating signals at ones of said frequencies of interest corresponding to the supplied control signals, each of said controllable means including means for adjusting the amplitude of said pulsating signals at each frequency of interest to be a predetermined level, the predetermined level associated with each frequency of interest being determined in accordance with the attenuation versus frequency characteristic of said low-pass filter so that the amplitude of the output from said filter is a constant level for all frequencies of interest; and means for combining the pulsating signals from said at least first and second controllable means, the resultant combined signal being supplied to said low-pass filter.

14. Apparatus as defined in claim 13 wherein each of said controllable means further includes a programmable digital counter supplied with said clock pulses and responsive to said control signals for generating pulse signals at individual ones of the frequencies of interest and means for converting said pulse signals into pulsating signals having a substantially rectangular wave-shape and a fundamental frequency at the frequency of interest being generated.

15. Apparatus as defined in claim 13 wherein the frequency of the pulse signal output from each of said digital counters of said first and second controllable means is at least four times the frequency of the signal being generated, and wherein said converting means includes digital means for dividing the pulse output from said counter by said at least four and means responsive to said control signals for setting said divider to a prescribed initial state at each frequency of interest and controllable gate means in circuit with said digital divider means and being responsive to said pulsating signal and said control signals selectively to generate a version of said pulsating signal in which the initial pulse of said version of said pulsating signal has a pulse width one-half the pulse width of subsequent pulses of said version of said pulsating signal at each frequency of interest.

16. The apparatus as defined in claim 15 further including means for biasing said combined signal so that the combined signal has a zero average value when supplied to said filter.

* * * * *

UNITED STATES PATENT OFFICE
CERTIFICATE OF CORRECTION

Patent No. 3,838,348 Dated September 24, 1974

Inventor(s) David A. Pezzutti

It is certified that error appears in the above-identified patent and that said Letters Patent are hereby corrected as shown below:

Column, 3, line 44, add

Figure 7:
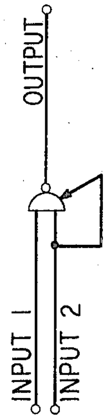

--FIG. 7 depicts the tri-state logic NAND gate used in the circuit of FIG. 1.--.

Column 9, line 14, "mounting" should read --counting--.

Signed and sealed this 26th day of November 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.